(12) United States Patent
Knocke et al.

(10) Patent No.: US 6,747,768 B1
(45) Date of Patent: Jun. 8, 2004

(54) INFORMATION CARRIER WITH A HOLOGRAM

(75) Inventors: Frank Knocke, Ebersberg (DE); Dieter Ebert, Strasslach (DE)

(73) Assignee: Xetos AG, Strasslach (DE)

( * ) Notice: Subject to any disclaimer, the term of this patent is extended or adjusted under 35 U.S.C. 154(b) by 0 days.

(21) Appl. No.: 09/980,031

(22) PCT Filed: May 22, 2000

(86) PCT No.: PCT/EP00/04642

§ 371 (c)(1),
(2), (4) Date: Apr. 25, 2002

(87) PCT Pub. No.: WO00/73089

PCT Pub. Date: Dec. 7, 2000

(30) Foreign Application Priority Data

May 27, 1999 (DE) .......................................... 199 24 385

(51) Int. Cl.⁷ ................................................. G03H 1/00
(52) U.S. Cl. ..................... 359/2; 359/1; 359/3; 359/24; 283/86
(58) Field of Search ...................... 359/2, 3, 22, 24–32; 283/85, 86, 94

(56) References Cited

U.S. PATENT DOCUMENTS

| | | |
|---|---|---|
| 4,140,373 A | 2/1979 | Rüll |
| 4,889,366 A | 12/1989 | Fabbiani |
| 5,200,794 A | 4/1993 | Nishiguma et al. |
| 5,284,364 A | 2/1994 | Jain |
| 5,319,476 A * | 6/1994 | Yamazaki et al. ............. 359/2 |
| 5,483,363 A * | 1/1996 | Holmes et al. ................ 359/2 |

* cited by examiner

Primary Examiner—Drew Dunn
Assistant Examiner—Fayez Assaf
(74) Attorney, Agent, or Firm—Ohlandt, Greeley, Ruggiero & Perle

(57) ABSTRACT

An information carrier includes information in the form of a hologram. In order to increase protection against copying and/or as a simple recognizable additional security feature of this information carrier, the hologram is the combination of a transmission hologram and a reflection hologram.

15 Claims, 1 Drawing Sheet

Figure
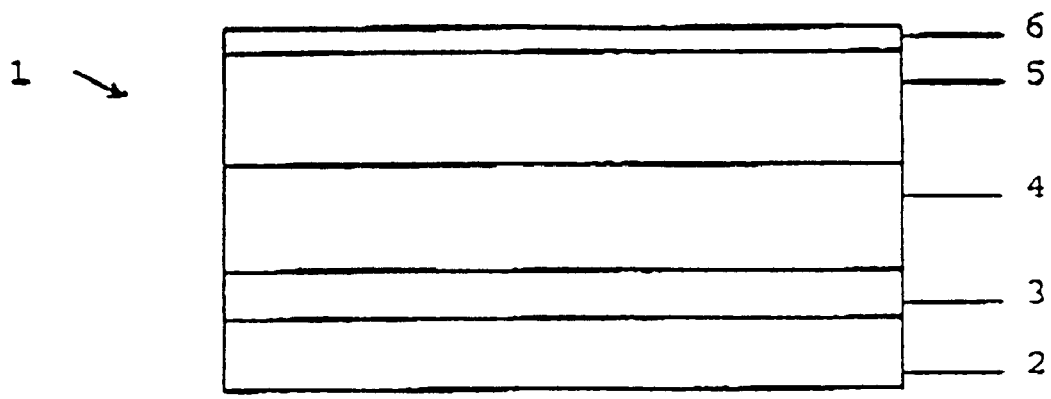

INFORMATION CARRIER WITH A HOLOGRAM

BACKGROUND OF THE INVENTION

1. Field of the Invention

The invention concerns an information carrier, in which information is contained in the form of a hologram.

2. Discussion of the Background Art

Such information carriers frequently serve as security seals, for example, for characterizing trademark products (electronic components, computer components, pharmaceutical products, image, audio and data media, clothing articles, etc.). There is also a requirement for security against counterfeiting in the case of bank notes. For this purpose, information is introduced onto an information carrier in the form of a hologram by means of appropriate and expensive methods. This information then cannot simply be copied by means of a conventional copying machine (e.g., for copying printed paper) onto another information carrier.

Frequently, information is stored either in the form of a transmission hologram or in the form of a reflection hologram, on pieces of foil that are in turn glued onto products for purposes of protection against copying. These so-called security seals serve for authenticating the marketed product. Depending on the angle of lighting and the viewing angle each time, the observer perceives different colors, patterns and motifs. The construction of these foil layers and the technical expenditure in their production offer a meaningful protection against simple copying and thus marketing of counterfeit products with the copied security seal. A copying of film holograms or volume holograms, which have stored the information in a high-resolution photo layer, can basically be accomplished only with expensive laser equipment, which can supply the coherent light that is necessary and sufficient for copying.

In the case of the known information carriers with holograms, despite the measures taken, there is always a need to further increase the protection against copying.

SUMMARY OF THE INVENTION

The object of the invention is to create an information carrier of the type named initially with increased copy protection and/or an additional easily recognizable security feature.

The invention solves this object with the subject of claim 1.

Preferred examples of embodiment of the invention are described in the dependent claims 2 to 9. In addition, preferred methods for the production of such information carriers according to the invention are described in claims 10 to 14.

According to claim 1, the hologram in an information carrier of the type named initially is the combination of a transmission hologram and a reflection hologram.

The information carrier may be comprised, among other things, of any of the initially named materials, for example, a foil (e.g., in the form of a security seal) or a more solid-type material, which is partially transparent upon examination, or contains the combination of a transmission hologram and a reflection hologram in at least one intermediate layer lying inside the material. The information carrier may also be part of a larger design of information carriers, which comprise, for example, collateral sheets, bank notes, credit cards, packagings, labels, images, etc., with additional printing. Additional information, which is for the most part visible (i.e. can be read or presented with light in the optically visible region) can also be printed or otherwise introduced onto these materials. However, information in the optically invisible range can also be contained therein (e.g., information that can be read with UV or IR light).

In addition, the information contained in the respective type of hologram (transmission or reflection hologram) can be stored in an optically visible manner (i.e. recognizable upon irradiation with visible light) or in an invisible manner (e.g., recognizable only upon irradiation with UV light or IR light). The information itself may be contained as a three-dimensional hologram (volumetric reproduction of an object in a complete three-dimensional reproduction), a two-dimensional/three-dimensional hologram (flat motif with a three-dimensional background), two-dimensional hologram (flat graphic), etc.

The information may also comprise purely geometric or irregular, (apparently) random patterns. For example, the transmission hologram may contain information in the form of one or more uniform surfaces, which iridesce, for example, only in rainbow colors upon irradiation with white light. This "play on colors" represents information in the sense of the invention.

Basically, holographically stored information of film or volume holograms is meaningfully protected from copying, since coherent light sources must be used for such copying. In addition, the combination of the two hologram types into one hologram according to the invention offers the following additional advantages: either one or the other or both holograms appear each time depending on the lighting (from the front or from the back) with respect to the information carrier, or depending on the angle of lighting and the angle of viewing when a reflector-type transmission hologram or raised hologram is used in combination with the reflection hologram. The two types of holograms can be clearly differentiated from one another on the basis of their characteristic apparent images, so that, in principle, it is not possible to imitate the "motif" of one type of hologram by an identical pattern in the form of the other type of hologram. One of the hologram types can thus serve as the "watermark" for the other type of hologram. Thus, e.g., with normal viewing, only one type of hologram may be visible, while the other appears only under specific conditions (depending on the light wavelength or the angle of incidence of the reconstruction light, etc.), which are known only to the initiated. Copying is made even more difficult, since the two types of holograms must be copied in different ways each time. Thus, for example, the "concealed" type of hologram is not automatically copied when the visible type of hologram is copied, so that the copy no longer contains the "concealed" hologram type.

According to a first example of embodiment, the combination of the two types of holograms preferably consists of the fact that the transmission hologram and the reflection hologram are contained in two separate hologram layers, wherein the two hologram layers are arranged one on top of the other, and at least one hologram layer is transparent. Also, with this layering of two hologram layers, both types of hologram appear simultaneously, as long as the upper layer of the hologram lying closer to the readout side of the information carrier is transparent.

According to a second example of embodiment, the combination consists of the fact that the transmission hologram and the reflection hologram are contained together in a single hologram layer. For the production of such an information carrier, preferably both types of holograms are recorded simultaneously or the transmission hologram is recorded first and then the reflection hologram, or vice versa. Alternatively, in the production of the information carrier according to the second example of embodiment, the transmission hologram and the reflection hologram can be recorded by alternating pixels or alternating lines. This pixel-type or line-type recording can be produced preferably either by means of an appropriate mask, wherein the transmission hologram and the reflection hologram are then recorded sequentially in time, or by means of a controlled light beam.

The reflection hologram is preferably designed in such a way that it serves for a one-color, multi-color or true-color illumination of the transmission hologram. Advantageously, nearly any type of transmission hologram (not only in the form of rainbow holograms, among other types) can be rendered in a true-color manner also with sufficiently sharp contrast.

If the carrier material of the information carrier is not light-transparent, a layer is provided that back-reflects light into the hologram layer or layers on one side of the two hologram layers or the single hologram layer. The light striking the information carrier over the considered surface passes through the hologram layer(s) containing the combination of the two hologram types and is reflected back into the hologram layer(s) by the reflecting layer. The reconstruction light beam thus arrives, so to speak, also from behind into the hologram layer(s). Advantageously, the usual transmission hologram (which normally requires reconstruction light striking from behind) can be viewed with reconstruction light striking from in front by means of this measure.

Advantageously, the transmission hologram and/or the reflection hologram is contained in such a way that it is visible only under one or more specific viewing angles. Advantageously, one of the hologram types, as a simple recognizable optical security seal, like a watermark in a banknote, can increase the clear and reliable recognizability of the original product provided thereby. In addition, different motifs or pieces of information can be visible each time in the transmission hologram and/or the reflection hologram, depending on the viewing angle (sequence of motion when the information carrier is inclined relative to the lighting source).

Preferably, the information of the transmission hologram and/or the reflection hologram at least partially comprises coded information. In addition to the directly recognizable information, further information may be contained, which can be recognized only with a specific decoding key, which is contained, for example, on another information carrier as a master key, or is visible only with the use of several reconstruction beams in a specific angular arrangement.

Preferably, the coded information of the transmission hologram is the decoding key for the coded information of the reflection hologram, or vice versa. In this way, the coded information is only decoded and thus visible if the other type of hologram is also still completely present. A decoding key, which lies above the motif only as a uniform "gray smear" or the like and is thus not recognizable as a key, can be contained in one of the hologram types, for example, in addition to its own recognizable motif. The decoding key appears and decodes the coded information of the other type of hologram only upon irradiation of the information carrier with a specific wavelength (e.g., in the optically invisible region) or at one or more specific angles. In addition, the latter type of hologram may contain still additional uncoded information, which is optically visible, in addition to the coded information. Thus, in the case of an impermissible copying of the information carrier, the decoding key is not copied (since, for example, the wavelength range or the one or more reconstruction angles are not known, with which the decoding key and/or the coded information are redorded), and the coded information of the unauthorized copy is no longer decoded upon irradiation with the specific wavelength.

Preferably, a transparent copy-protection layer with a property that rotates the polarization of the readout light and/or a filtering property is introduced onto the viewing surface. The advantage of this copy-protection layer lies in the fact that it cannot be recognized, for example, with the naked eye. If the information carrier is now photographically or holographically copied, then the copy no longer contains this copy-protection layer. A polarization foil (or a corresponding polarizer) placed over the copy and the original can differentiate between the two of them with appropriate alignment, since the original darkens at a specific alignment of the polarization foil. If copied with polarized light, with specific alignment, the information of the original, for example, generally cannot be read out. For other embodiments of the copy-protection layer, reference is made to the German Patent Application 199 04 282.9, the disclosure content of which is fully incorporated herewith in the present application. The advantageous examples of embodiment described therein of the copy-protection layer with the information carrier having a hologram may be used alternatively or together with the two types of holograms. Thus, for example, the coded information of the reflection hologram, either alone or in combination with the coded information of the transmission hologram, can be a decoding key for the coded information of the copy-protection layer, or vice versa. To the person with average skill in the art, it is self-evident with a combination of three possibilities (copy-protection layer plus two types of holograms), each of which may contain coded information for a decoding key, to combine two of these randomly, so that the combination of the two together comprises the coded information or the decoding key. Alternatively, one type of hologram does not participate in the coding or decoding.

Particularly preferred: when the information carrier is used as a security seal, the (coded) information of the transmission hologram and/or the reflection hologram contains at least partially individualized information. Thus, when producing security seals, it may be of advantage to introduce, for example, continuous serial numbers in the security seal.

BRIEF DESCRIPTION OF THE DRAWINGS

The invention and additional advantages of the invention will now be explained in more detail on the basis of preferred examples of embodiment with reference to the attached figure.

FIG. 1 shows a cross-sectional view of a first example of an embodiment of an information carrier according to the invention.

DETAILED DESCRIPTION OF THE INVENTION

Information carrier 1 can serve, for example, as a carrier of data or as a security seal.

Information carrier 1 is comprised of a carrier layer 2, for example, which is comprised of a plastic, paper or fabric material, or any other material (depending on the application objective of information carrier 1). A light-reflecting layer 3 which back-reflects upward. the light falling from the top onto layer 3 is glued or otherwise introduced onto carrier layer 2. According to the first example of embodiment, a first hologram layer 4, in which the first type of hologram (transmission or reflection hologram) is recorded, is introduced on light-reflecting layer 3. A second hologram layer 5, in which the second type of hologram is recorded, is introduced on the first hologram layer 4. Still another protective layer 6 is optionally introduced on second hologram layer 5.

According to a second example of embodiment, which is not shown, only one hologram layer 4, in which both types of holograms are recorded, is introduced on light-reflecting layer 3.

Basically, a distinction is made between a transmission hologram and a reflection hologram in the field of holography. In the case of the transmission hologram, the interference pattern is stored essentially only in one plane—e.g., one surface of information carrier 2—, while in a reflection hologram, the information is also contained in the depth or volume. This will be explained in more detail below.

A transmission hologram is formed if the object and reference beams fall on a hologram layer (photoplate, etc.) from the same side. In this case, the interference lines from the object beam and reference beam are almost perpendicular to the hologram layer. The grid structure that is formed diffracts the white light used for the readout when the hologram stored in the hologram layer is read out, and breaks it down into its spectral colors. These white-light transmission holograms are thus also called rainbow holograms.

A transmission hologram may also be present as a relief hologram, whose holographically contained information lies in a relief structure on an outer surface. The holographically contained information is visible upon viewing this outer surface or upon illumination of this outer surface with specific light sources. In the case of transparent hologram layers, the information may lie in blackened, light-diffracting or light-refracting regions within the transparent material, whereby the hologram layer is then back-illuminated and the hologram is thus visible from the front. For the case of a nontransparent carrier layer 2, the light-reflecting layer 3 is thus introduced behind hologram layer 4, so that the reconstruction light beam strikes hologram layer 4 in front, is reflected backward to light-reflecting layer 3 through hologram layer 4, and then exits as the reconstructed object beam in front.

A reflection hologram is formed, if the object light beam and the reference light beam each fall on the hologram layer, one from the front and one from the back, and interfere with each other therein. In this case, the interference lines run parallel to the hologram layer. In the case of a transparent phase hologram, planes with different refraction indices thus arise. The incident readout light is reflected at these so-called Bragg planes and in this way a specific wavelength (and frequency) of the light is selected by interference (in which the Bragg condition is fulfilled). Reflection holograms irradiated with white light thus appear to be a single color, and, in fact, the color of the reference light beam used for recording (as long as the light-sensitive hologram layer has not changed during the exposure, e.g., has not shrunk or swollen). If several light wavelengths (red, green and blue) are used for recording the hologram, then the information appears in multicolors or in fact, true colors, upon readout with white light.

The image reconstructed from a reflection hologram thus has a wavelength dependence as well as an angular dependence of the incident reconstruction beam. This can be utilized for the purpose of storing several different motifs simultaneously and holographically in the hologram layer.

The two types of holograms have clearly distinguishable appearance images depending on the above-described properties.

According to an example of embodiment (which is not shown), a copy-protection layer can be provided instead of or in addition to protective layer 6. For other details and advantages of such a copy-protection layer, reference is made to the German Patent Application 199 04 282.9, the content of which is fully incorporated herein.

The individual layers 2 to 6 may thus be glued together so that if an attempt is made to strip off individual layers, the layer that is stripped off is at least partially disrupted. For example, for this purpose, a perforation can be introduced into individual layers 2 to 6, which breaks this layer up into smaller segments when it is stripped off. Also, a diffusion glue can be utilized, which penetrates into the layer material and breaks up the layer if it is stripped off.

The information presented by the two types of holograms may also be coded at least partially in each hologram type. In addition, the coded information of one type of hologram can serve as the decoding key for coded information of the other type of hologram. The coded information in the respective hologram can thus be present in addition to a visible hologram and is not recognizable as such. Therefore, the person attempting to make the copy generally knows nothing of the coded information that is present.

A possible coding consists of representing either a dark or a light pixel of the information to be coded by means of four subpixels of the transmission hologram and the reflection hologram (and also the copy-protection layer, if necessary) arranged in a square. A dark pixel corresponds, for example, to four dark subpixels, while a light pixel corresponds to any two light subpixels, and any two dark subpixels. Overall, the subpixels of individual layers 2 and 4, however, are stochastically distributed, so that only a uniform gray smear can be recognized in both types of holograms. The only condition is that the two dark subpixels of each type of hologram coincide for one light pixel of the information to be coded, while they do not coincide for a corresponding dark pixel.

This coding may also be applied only between one of the hologram types and a foil that can be applied with a corresponding pixel pattern as the decoding key. Thus, the individual pixels of the respective type of hologram will be visible only through the applied foil, whose contained "gray" pixel pattern together with the "gray" pixel pattern of the hologram type involved makes the information recognizable.

The coded information may also be decoded by a specific reconstruction light arrangement. A completely specific reconstruction angle which is known only to the manufacturer can be assigned to each subpixel in the hologram. The decoded information appears only when irradiated under the lighting angles known to the manufacturer. The necessary illumination angles may be obtained, e.g., by an optical Fourier transform from a master key.

Thus, for example, when it is used as a security seal, information carrier 1 may contain at least partially individualized information (e.g., running serial numbers) in the coded information of the hologram type involved, which can be read out only with a master decoding key. Continuous serial numbers, however, may also be introduced uncoded into one of the two types of holograms or completely comprise the information of one hologram type (the reflection hologram can show, for example, only a two-dimensionally represented serial number, which appears at a specific viewing angle). The individualized code can be introduced in a technically simple manner in the production of the information carrier serving as the security seal, for example, by means of a transparent liquid-crystal display. In copying, each security seal must then be individually copied: a "print" of a security seal as a master copy will no longer supply the running serial numbers.

The combination of transmission hologram and reflection hologram may be alternatively produced by means of the following method.

The two types of holograms can be recorded, one in hologram layer 4 and the other in hologram layer 5. The two hologram layers 4 and 5 with the recorded holograms are then glued one over the other. At least the upper-lying hologram layer 5 must be transparent, so that the hologram of hologram layer 4 lying underneath is visible. Hologram layer 4 lying underneath may thus be a non-transparent layer (e.g., a metal layer, etc.), and its transmission hologram is recorded in a surface structure.

As long as a specific reflection hologram, which selects only a specific wavelength from white light and reflects it upward, is recorded in hologram layer 4 lying underneath, the transmission hologram of hologram layer 5 lying on top of this will also be read out with this one wavelength of the reflected light beam (reconstruction light beam for the transmission hologram). In addition, the specific reflection hologram can reflect the reconstruction light beam also only at a specific angle, so that very general transmission holograms can also be read out with white light, which are thus not recorded in the form of a Benton hologram or rainbow hologram. In particular, the reflection hologram can select from the white light the pixel-type or line-type red, green and blue light, so that the transmission hologram recorded correspondingly and lying above appears either in multicolor or in true colors.

According to the second example of embodiment, one and the same hologram layer can be exposed twice, and in fact sequentially for storing the transmission hologram and the reflection hologram or vice versa. Reference beam and object beam must fall onto the hologram layer from the same side in the case of the recording of a transmission hologram and must fall from opposite sides in the case of the recording of a reflection hologram.

According to a third example of embodiment, which is not shown, the transmission hologram and reflection hologram may also be recorded by alternating lines or also by alternating pixels. For this purpose, the object beam is focussed by means of a controlled object-beam modulation unit and a lens, for example, onto a pixel surface with dimensions of 1×1 mm². Depending on the hologram type each time, the reference beam is focussed onto the same pixel surface as the object beam from the same side or from the opposite side. Thus a complete hologram of the object is recorded on this pixel surface of the hologram layer. For multicolor recording, the individual colors (e.g., primary colors) can also be recorded by pixels. The same is true also for linewise recording of the individual types of holograms. The pixel surface or the line width can thus be randomly selected in principle, whereby the resolution of the recorded hologram decreases with surfaces or widths that become smaller. In addition, different holograms can be recorded for different pixels, which appear, for example, when viewed as a function of the viewing angle.

According to an alternative production process, the recording by pixels or by lines may also be accomplished by means of a suitable mask, whereby, e.g., first only the transmission hologram is recorded, the mask is then shifted so that the as-yet unexposed regions are released and then the reflection hologram is recorded. Several different motifs per hologram type also can be recorded with suitable masks or by displacements of a single mask.

In order to better understand the advantage of the invention, a familiar copying process for the copying of holograms will be explained below, the so-called contact copy. As in conventional photography, hologram layers 4 and 5 freed of the other layers 2 and 3, as well as of copy-protection layer 6, if present, are applied together onto a copy medium (recording material), on which the two types of hologram will be copied. If the recording material is now irradiated with non-coherent light (or light with too short a coherent length) or at an incorrect reconstruction angle when the hologram is copied, then the copy that is obtained would be unusable or extremely unsatisfactory. The stored object light waves, which interfere with the illumination wave only when coherent light is used and expose the copy medium with the hologram structure (interference pattern) only arise in the case of correct angles of illumination.

In the case of the contact copy, however, a distinction must be made between copying the transmission hologram and copying the reflection hologram. In the case of the transmission copy, the object beam reading out from the information carrier and the reference beam used for recording in the copy medium must fall on the same side of the copy medium, while they must fall on opposite sides of the copy medium in the case of the reflection copy. Thus two different copying arrangements must be used (in one case, the copy medium lies over the original film and in the other case it lies under the original film), which increases copy protection still further. In particular, the above-mentioned use of several reference beam angles can continuously increase the expenditure for making a copy. The keying of hologram information with many different reference beam angles or a hidden special reference light wave can in fact make copying impossible.

What is claimed is:

1. An information carrier in which information is contained in the form of a hologram, wherein the hologram is the combination of a transmission hologram and a reflection hologram.

2. The information carrier according to claim 1, wherein the transmission hologram and the reflection hologram are included in two separate hologram layers, and wherein the two separate hologram layers are arranged over one another and at least one of said two separate hologram layers is transparent.

3. The information carrier according to claim 1, wherein the transmission and reflection holograms are together included in a single hologram layer.

4. The information carrier according to claim 1, wherein the reflection hologram is designed in such a way that it serves for one-color, multicolor or true-color illumination of the transmission hologram.

5. The information carrier according to claim 1, further comprising a least two hologram layers and a back reflecting layer which back-reflects lights into at least one of said at least two hologram layers, wherein said back reflecting layer is located on one side of each of said at least two hologram layers or on one side of one of said at least two separate hologram layers.

6. The information carrier according to claim 1, wherein the transmission hologram and/or the reflection hologram is visible only at one or more specific viewing angles.

7. The information carrier according to claim 1, wherein the transmission hologram and/or the reflection hologram comprises at least partially coded information.

8. The information carrier according to claim 7, wherein said at least partially coded information of the transmission hologram is a decoding key for said at least partially coded information of the reflection hologram, or vice versa.

9. The information carrier according to claim 7, wherein said at least partially coded information of the transmission hologram and/or the reflection hologram includes individualized information.

10. The information carrier according to claim 1, further comprising a viewing surface having a transparent copy-protection layer with a property that rotates the polarization of a readout light and/or a filtering property.

11. A method for producing an information carrier comprising:
   recording information in a hologram, wherein said hologram is a combination of a transmission hologram and a reflection hologram;
   recording said transmission hologram in a first hologram layer;
   recording said reflection hologram in a second hologram record; and
   laminating said first and second hologram layers one on top of the other.

12. A method for producing an information carrier comprising:
   recording information in a hologram, wherein said hologram is a combination of a transmission hologram and a reflection hologram;
   recording said reflection hologram in a single hologram layer; and
   recording said transmission hologram in said single hologram layer, or vice versa.

13. The method for producing an information carrier according to claim 12, further comprising recording said transmission hologram and said reflection hologram by alternating pixels or by alternating lines in said single hologram layer.

14. The method for producing an information carrier according to claim 13, wherein said alternating pixel or alternating line recording is produced by means of at least one mask, and further wherein said transmission hologram and said reflection hologram are recorded sequentially in time.

15. The method for producing an information carrier according to claim 13, wherein said alternating pixel or alternating line recording is produced by means of a controlled light beam.

* * * * *